(12) United States Patent
Yanagidani et al.

(10) Patent No.: US 9,614,213 B2
(45) Date of Patent: Apr. 4, 2017

(54) BATTERY PACK

(71) Applicant: Sanyo Electric Co., LTD., Osaka (JP)

(72) Inventors: Keiichi Yanagidani, Hyogo (JP);
Takashi Namura, Hyogo (JP)

(73) Assignee: SANYO ELECTRIC CO., LTD.,
Osaka (JP)

(*) Notice: Subject to any disclaimer, the term of this patent is extended or adjusted under 35 U.S.C. 154(b) by 563 days.

(21) Appl. No.: 14/356,179

(22) PCT Filed: Nov. 5, 2012

(86) PCT No.: PCT/JP2012/078638
§ 371 (c)(1),
(2) Date: May 5, 2014

(87) PCT Pub. No.: WO2013/069609
PCT Pub. Date: May 16, 2013

(65) Prior Publication Data
US 2014/0308543 A1    Oct. 16, 2014

(30) Foreign Application Priority Data

Nov. 11, 2011    (JP) .................. 2011-247208

(51) Int. Cl.
*H01M 2/34*      (2006.01)
*H01M 10/42*     (2006.01)
(Continued)

(52) U.S. Cl.
CPC .............. *H01M 2/34* (2013.01); *H01M 2/08* (2013.01); *H01M 2/1061* (2013.01); *H01M 2/30* (2013.01); *H01M 10/425* (2013.01)

(58) Field of Classification Search
CPC .......... H01M 10/425; H01M 10/4257; H01M 2010/4271

See application file for complete search history.

(56) References Cited

U.S. PATENT DOCUMENTS 6,432,578 B1    8/2002   Sugita et al.
2007/0202364 A1  8/2007  Uh et al.
(Continued)

FOREIGN PATENT DOCUMENTS

CN    1253384    5/2000
CN    101483225  7/2009
(Continued)

OTHER PUBLICATIONS

International Search Report issued Feb. 5, 2013 in International (PCT) Application No. PCT/JP2012/078638.
(Continued)

*Primary Examiner* — Barbara Gilliam
*Assistant Examiner* — Robert S Carrico
(74) *Attorney, Agent, or Firm* — Wenderoth, Lind & Ponack, L.L.P.

(57) ABSTRACT

A window portion allowing the terminal of the cell to be inserted through is opened in the board holder, and projecting portions are provided projecting inward in the window portion in plural locations of the edge sides facing the window portion in the board holder. And the plural projecting portions in the board holder each decrease in cross-sectional size toward the tips of the plural projecting portions, the board holder is engaged in position by the tips of the plural projecting portions at least partially contacting the under surface of the terminal of the cell which is exposed to the sealing plate side without being covered by a gasket.

9 Claims, 9 Drawing Sheets

(51) Int. Cl.
*H01M 2/10* (2006.01)
*H01M 2/08* (2006.01)
*H01M 2/30* (2006.01)

(56) References Cited

U.S. PATENT DOCUMENTS

| | | | |
|---|---|---|---|
| 2009/0087734 A1 | 4/2009 | Akatsuchi et al. | |
| 2009/0092860 A1* | 4/2009 | Yamamoto | H01M 2/0267 |
| | | | 429/7 |
| 2010/0136423 A1 | 6/2010 | Seo et al. | |
| 2011/0052957 A1 | 3/2011 | Ohta | |
| 2011/0097606 A1 | 4/2011 | Namura | |
| 2012/0190252 A1* | 7/2012 | Pavlinsky | H01M 10/425 |
| | | | 439/775 |

FOREIGN PATENT DOCUMENTS

| | | |
|---|---|---|
| JP | 2006-164601 | 6/2006 |
| JP | 2007-234586 | 9/2007 |
| JP | 2009-087555 | 4/2009 |
| JP | 2009-170156 | 7/2009 |
| JP | 2009-272160 | 11/2009 |
| JP | 2010-135303 | 6/2010 |
| JP | 2011-090883 | 5/2011 |

OTHER PUBLICATIONS

English translation of Chinese Search Report dated Nov. 30, 2015 in corresponding Chinese patent application No. 201280055311.7.

* cited by examiner

BATTERY PACK

TECHNICAL FIELD

This invention is related to a battery pack, especially, a structure in which a board holder is set to the cell.

BACKGROUND ART

The battery pack is widely used as an electric power source of a mobile electric equipment, for example, such as a mobile phone. The battery pack has, for example, a structure assembling a flat prismatic shaped cell and an electric circuit board to aim at protection of the cell. In addition, for the purpose of a positioning of the circuit board corresponding to the cell and an undesired short circuit between the outer surface of the cell and the circuit board, for example, a board holder made of resin is inserted between the cell and the circuit board in the battery pack.

As mentioned above, the circuit board is set to the cell through the board holder, and in this state a cap or a label is set or stuck to the cell as the outer structure in the battery pack.

CITATION LIST

Patent Literature

Patent Literature 1:
Japanese Laid-Open Patent Publication No. 2006-164601
Patent Literature 2:
Japanese Laid-Open Patent Publication No. 2011-90883

SUMMARY OF THE INVENTION

However, in the battery pack related to conventional art, as the board holder is sandwiched between the cell and the electric circuit board and is not particularly fixed to the cell, at the time of a cap or a label being set or stuck to the cell, positioning of the board holder need be carried out every time it occurs. Therefore, in a construction of the battery pack of conventional art, works in manufacturing steps are complicated, improvements from a view point of manufacturing cost are required.

In addition, as conventional art, the following technique is proposed. A board holder has a projection facing a cell, and a recess in the outer surface of the cell is provided to store the projection facing the projection of the board holder. And at the time of setting the board holder, the projection is inserted into the recess, then the tip of the projection is crushed. However, in the case of fixing the board holder to the cell by the construction of inserting the projection into the recess and crushing the tip of the projection, power crushing the tip is needed to some degree, works are complicated. Further, the way of fixing by crushing the tip of the projection is inferior in certainty, and there is a problem of the board holder coming off.

Moreover, as conventional art, there is a technique of fixing a board holder and a cell by a two-faced adhesive tape therebetween. However, there is a problem of an increase in costs when the two-faced adhesive tape is used for a temporary fixing.

The present disclosure is developed for the purpose of solving such drawbacks. One non-limiting and explanary embodiment provides a battery pack having a construction certainly fixing a board holder to a cell without complicated works at the time of manufacturing.

A battery pack of the present disclosure comprises a cell including a cell case having a pipe shape and a bottom portion and a top opening, a sealing plate closing the top opening. An electric circuit board is disposed facing the sealing plate. A board holder is made of resin, and disposed between the circuit board and the sealing plate of the cell.

Further, a window portion allowing the terminal of the cell to be inserted through is opened in the board holder, and projecting portions are provided projecting inward in the window portion in plural locations of the edge sides facing the window portion in the board holder. And the plural projecting portions in the board holder each decrease in cross-sectional size toward the tips of the plural projecting portions, the board holder is engaged in position by the tips of the plural projecting portions at least partially contacting the outer surface of the terminal of the cell.

As mentioned above, in a battery pack of the present disclosure, projecting portions are provided at edge sides facing the window portion in the board holder. The tips of the plural projecting portions at least partially contact the outer surface of the terminal of the cell. Accordingly, the board holder is engaged to the cell in a positioned state. As mentioned above, in a battery pack of the present disclosure, projecting portions are provided at edge sides facing the window portion in the board holder. The tips of the plural projecting portions at least partially contact the outer surface of the terminal of the cell. Accordingly, the board holder is engaged to the cell in a positioned state. Therefore, in the construction of conventional art, the board holder is sandwiched between the cell and the circuit board. Compared with this, in the battery pack, in a manufacturing step after setting the board holder to the cell, positioning of the board holder 12 need not be carried out every time of manufacturing steps, then works in manufacturing steps are not complicated.

In addition, in the battery pack of the present disclosure, the tips of the plural projecting portions of the opening edge sides of the window portion in the board holder are engaged with or contact the negative terminal of the cell. By this, the board holder is set to the cell 10. In the above mentioned conventional art, the projection of the board holder is inserted into the recess of the cell, and the tip of the projection is crushed. Compared with this conventional art, in the battery pack, big pressing power or the like is not necessary at the time of assembling the board holder. In addition, after this assembling, the board holder does not easily come off from the cell.

Therefore, in the battery pack of the present disclosure, the board holder is certainly fixed to the cell without complicated works at the time of manufacturing. The battery pack can use the following constructions. The terminal of the cell has a T shaped cross section of which the base is narrower than the tip thereof, and externally projects from the surface of the sealing plate, and the projecting portions in the board holder have wedge-shaped cross sections which each decrease in cross-sectional size toward the tips of the plural projecting portions. Then the tips of the projecting portions at least partially contact the under surface of the projection of an eaves shape in the terminal.

By using such construction, at the time of setting the board holder to the cell, the window portion of the board holder is pressed and inserted to the terminal of the cell, till the tips of the plural portions (the plural projecting portions) of the tapering wedge shape at least partially contacts the under surface of the terminal. By this work, setting the board holder to the cell is completed. Therefore, the board holder is certainly fixed to the cell without complicated works.

Further, the tips of the plural projecting portions each having the tapering wedge shape are at least partially pushed into the under surface of the terminal of the cell. Therefore, after that, the engagement therebetween does not easily come off. Therefore, the board holder is certainly fixed to the cell without complicated works. In the battery pack of the present disclosure having the above construction, the terminal of the cell has a plane of a rectangular shape with rounded corners, and the window portion of the board holder has a plane of an octagonal opening shape. And the plural projecting portions at least partially contact the rounded corners of the terminal of the cell.

Therefore, it is possible to set the board holder to the cell by small pressing or pushing strength, and as mentioned above, once it is set, it is hard to come off. In the battery pack of the present disclosure having the above construction, the plural projecting portions partially contact short side portions of the terminal of the cell, and once it is set, it is hard to come off.

In the battery pack of the present disclosure having the above construction, a gasket is sandwiched between a part of the under surface of an overhanging portion of an eaves shape of the terminal and the sealing plate, and is made of lower elastic modulus of material than the terminal. Accordingly, the gasket is sandwiched between the part of the under surface of the overhanging portion and the sealing portion, and the tips of the plural projecting portions each having the tapering wedge shape at least partially contact the remaining portion of the under surface of the terminal of the cell. Therefore, big pressing or pushing power is not necessary at the time of setting the board holder to the cell.

In the battery pack of the present disclosure having the above construction, each tip of the plural projecting portions has a spindle or frustum shape, and is dispersed each other, and the tips of the plural projecting portions at least partially contact the side surface of the terminal of the cell. Therefore, as the tips of the plural projecting portions of the spindle or frustum shape at least partially contact the side surface of the terminal of the cell, the board holder is certainly fixed to the cell without complicated works at the time of manufacturing.

In addition, when by accumulation of errors or the like at the time of manufacturing the cell the center line of the terminal is a little inclined to the center line of the sealing plate, by rotating the board holder to the negative terminal of the cell, the manufacturing errors can be absorbed. Therefore, the relative position of the board holder to the sealing plate 20b of the cell 20 can be within the appropriate range, and the yield at the time of manufacturing can be improved.

Here, even after carrying out such angle adjustment by rotating the board holder, the tips of the projecting portions individually contact the side surfaces of the terminal, and it is hard that the board holder set to the cell comes off after assembling. In the battery pack of the present disclosure having the above construction, the plural projecting portions of the board holder at least partially contact the side surface of the terminal in a crushed state of the tips thereof. By such crushed portions, contact resistance at the tip portions of the projecting portions against the side surface of the terminal is increased. Therefore, it is hard that the board holder comes off after assembling.

DESCRIPTION OF EMBODIMENTS

The following describes embodiments of the present invention based on the figures. However, concrete embodiments in the following description are used as examples to easily understand the structure, operation, and results of the present invention, and other than essential elements, the present invention is in no way limited to those embodiments.

Embodiment 1

1. An Outline of a Configuration

Figure 1:
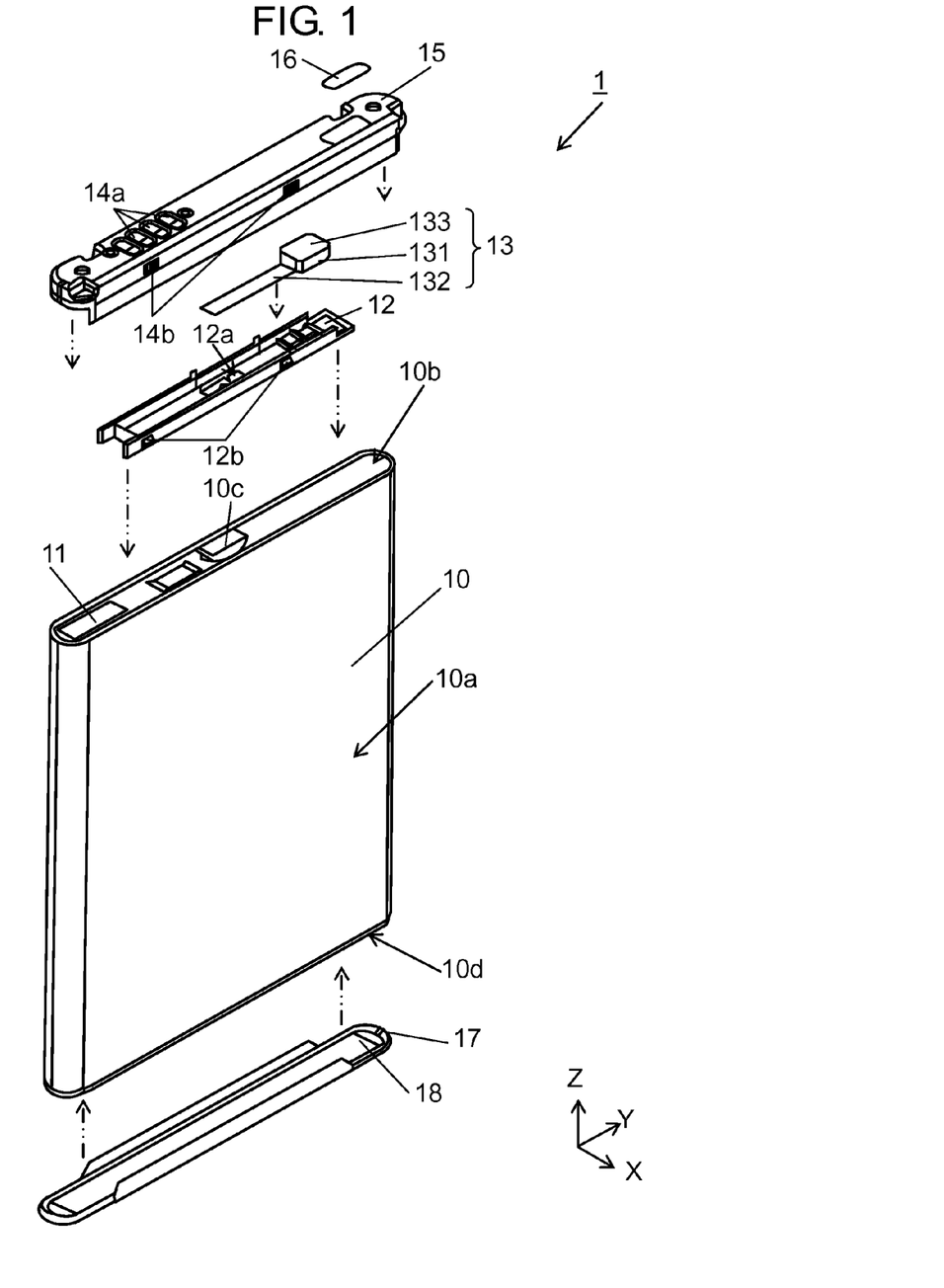
FIG. 1 is an exploded schematic perspective view illustrating a structure of a battery pack 1 related to an embodiment 1 of the present invention.

The outline of the configuration of a battery back related to the embodiment 1 of this invention is explained using FIG. 1.

As shown in FIG. 1, the battery back 1 related to the embodiment 1 of this invention includes a flat prismatic shaped cell 10. The cell 10, for example, a lithium ion secondary battery, includes a cell case 10a having a pipe shape and a bottom portion and a top opening, a sealing plate 10b closing the top opening, a negative terminal 10c externally projecting from a surface of the sealing plate 10b, namely, in the axis Z plus direction from the middle of the axis Y direction in the sealing plate 10b. Inside the cell case 10a closed by the sealing plate, electrode plates and an electrolyte are stored (it is not shown in figure).

The cell case 10a and the sealing plate 10b are positive pole, and made of, for example, aluminum alloy. Further, a clad plate 11 is connected to the sealing plate 10b in the left front side in the axis Y direction. A board holder 12 is positioned on the sealing plate 10b, and a PTC (Positive Temperature Coefficient) element 13 and a cap 15 are positioned on or over the board holder 12. Further, as it is not shown in the figure, the cap 15 houses an electric circuit board of a strip shape therein in advance. External terminals 14a of the circuit board are exposed from window portions opened and provided in the cap 15.

A window portion 12a allowing a negative terminal 10c to be inserted through is opened in the board holder 12. One element lead 132 of the PTC element 13 is connected to the upper surface of the negative terminal 10c exposed in the axis Z upper direction through the window portion 12a. And in the PTC element 13, the other element lead 133 of both element leads sandwiching an element body 131 is connected to a conductive land of the circuit board or a board lead (it is not shown in the figure).

Further, plural hook portions 12b projecting in the axis X direction are provided in the side walls of the board holder 12. Those hook portions 12b are engaged with corresponding opening portions 14b in the side walls of the cap 15. A label 16 is stuck on the right back side portion in the axis Y plus direction in the upper surface of the cap 15. Moreover, a bottom cover 17 is fixed to the bottom surface of the cell case 10a by a two-faced adhesive tape 18. In addition, as it is not shown in FIG. 1, an outer label is stuck mainly to the cell 10, exposing partial portions of the cap 15 and the bottom cover 17.

2. The Configuration of the Board Holder 12

Figure 2A:
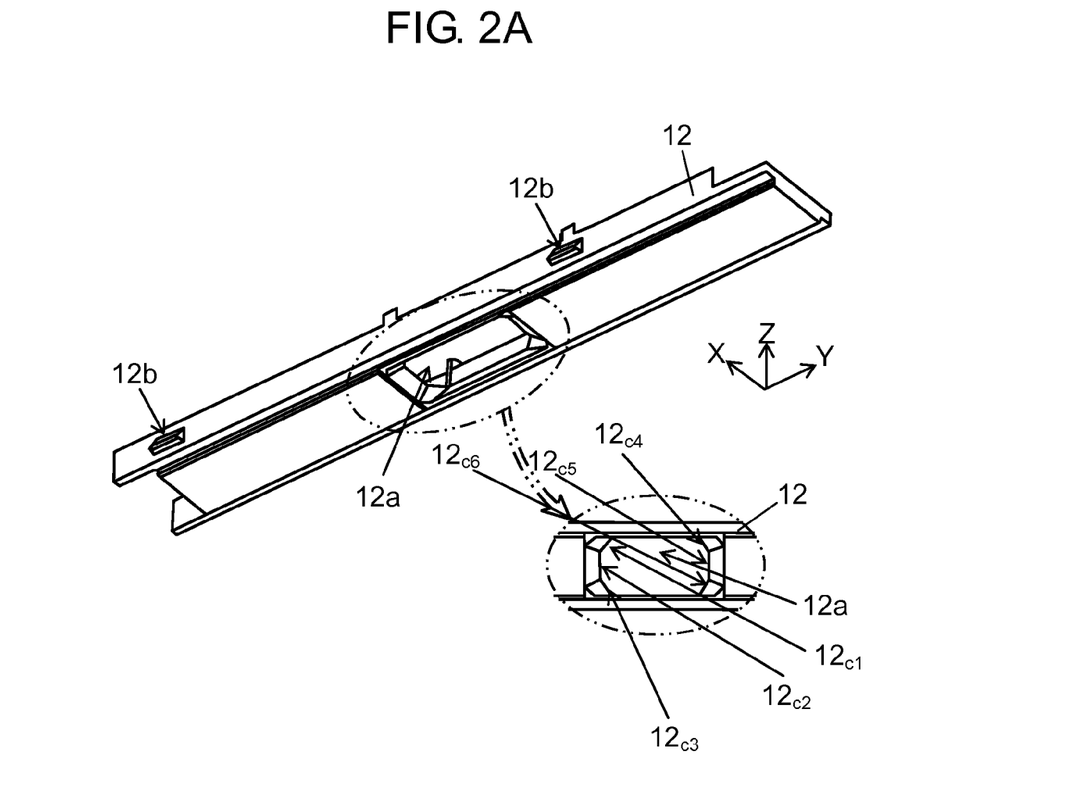
FIG. 2(a) is a schematic perspective view illustrating a structure a board holder 12 in the battery pack 1.
Figure 2B:
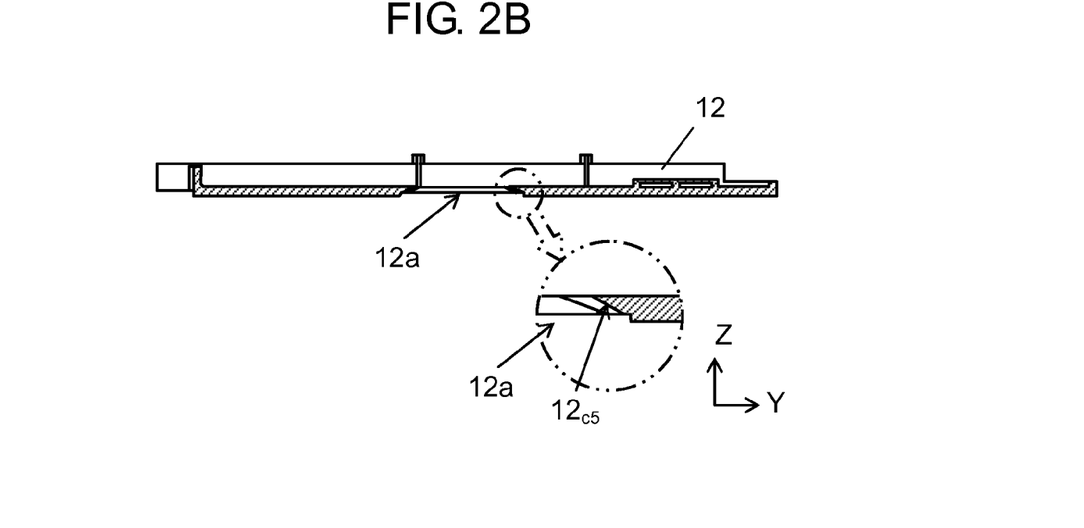
FIG. 2(b) is its schematic sectional view.

The configuration of the board holder 12 is explained using FIG. 2. FIG. 2(a) is a schematic perspective view of the board holder 12 from the sealing plate 10b side of FIG. 1, FIG. 2(b) is a schematic sectional view of the board holder 12 cut at a Y-Z plane. As shown in FIG. 2(a), the window portion 12a of the board holder 12 is opened approximately in the middle portion of the longitudinal direction (the axis Y direction). And as shown in the circle of the two-dot chain line in FIG. 2(a), tapered cuts are formed at each corner of the window portion 12a, in other words, the window portion 12a has an octagonal opening shape.

Further, in the embodiment, the opening shape of the window portion 12a is octagonal as one example, but the octagonal shape is not necessarily required. For example, in the opening shape of the window portion, polygonal shapes other than the octagonal shape, and elliptical or oval shapes can be used. Then, in this case, projecting portions projecting from the opening edge of the window portion are also provided. In the octagonal shape of the window portion 12a, the six opening edge sides except the two edge sides extending in the axis Y direction each have a wedge shape (projecting portions 12c1, 12c2, 12c3, 12c4, 12c5, 12c6).

As shown in FIG. 2(b), the projecting portions 12c1, 12c2, 12c3, 12c4, 12c5, 12c6 decrease at least in the tip portions in cross-sectional size toward the tips of the plural projecting portions, namely, from the base side toward the inner side of the window portion 12a. The upper surfaces thereof in the axis Z upper direction are in a horizontal plane surface, the under side surfaces are each in an inclined plane. Further, in FIG. 2(b), the cross-section view of the projecting portion 12c5 is shown, and the other projecting portions 12c1, 12c2, 12c3, 12c4, 12c6 each have the same cross-section view of the wedge shape as the projecting portion 12c5.

Figure 3:
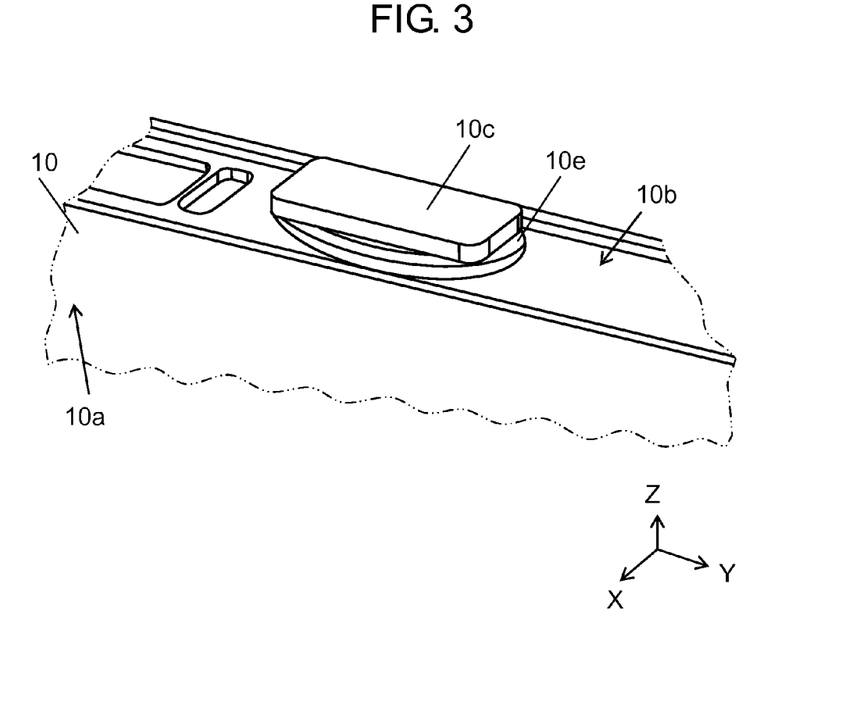
FIG. 3 is a schematic perspective view illustrating a structure of a cell 10 of the battery pack 1.

3. The Configuration of the Negative Terminal 10 of the Cell and its Surrounding Next, the configuration of the negative terminal 10 of the cell and its surrounding is explained using FIG. 3. As shown in FIG. 3, in the cell 10, the negative terminal 10c is projecting and set in the axis Z plus direction from the sealing plate 10b which closes the opening of the cell case. In the negative terminal 10c, the upper surface in the axis Z direction is approximately horizontal. The negative terminal 10c comprises a board shape portion including the upper surface and a pin shape portion (it is not shown in FIG. 3). Therefore, the negative terminal 10c has a T shape in X-Z plane cross-section view or Y-Z plane cross-section view.

A gasket 10e of an elastic body is sandwiched between a part of the under surface of the overhanging portion of an eaves shape in the negative terminal 10c and the sealing plate 10b. But the remaining portion of the under surface in the negative terminal 10c is exposed to the side of the sealing plate 10b without the gasket. Further, as shown in FIG. 3, in the cell 10 in this embodiment, the negative terminal 10c has a plane of a rectangular shape with rounded corners, but the length of the negative terminal 10c in the axis Y direction is a little narrower than the length between the tips of the projecting portion 12c2 and the projection portion 12c6 in the board holder 12. And the lengths between the facing rounded corners in the negative terminal 10c are a little narrower than the length between the tips of the projecting portion 12c1 and the projection portion 12c6, and the tips of the projecting portion 12c3 and the projection portion 12c4 in the board holder 12.

4. A State of Setting the Board Holder 12 to the Cell 10

Figure 4:
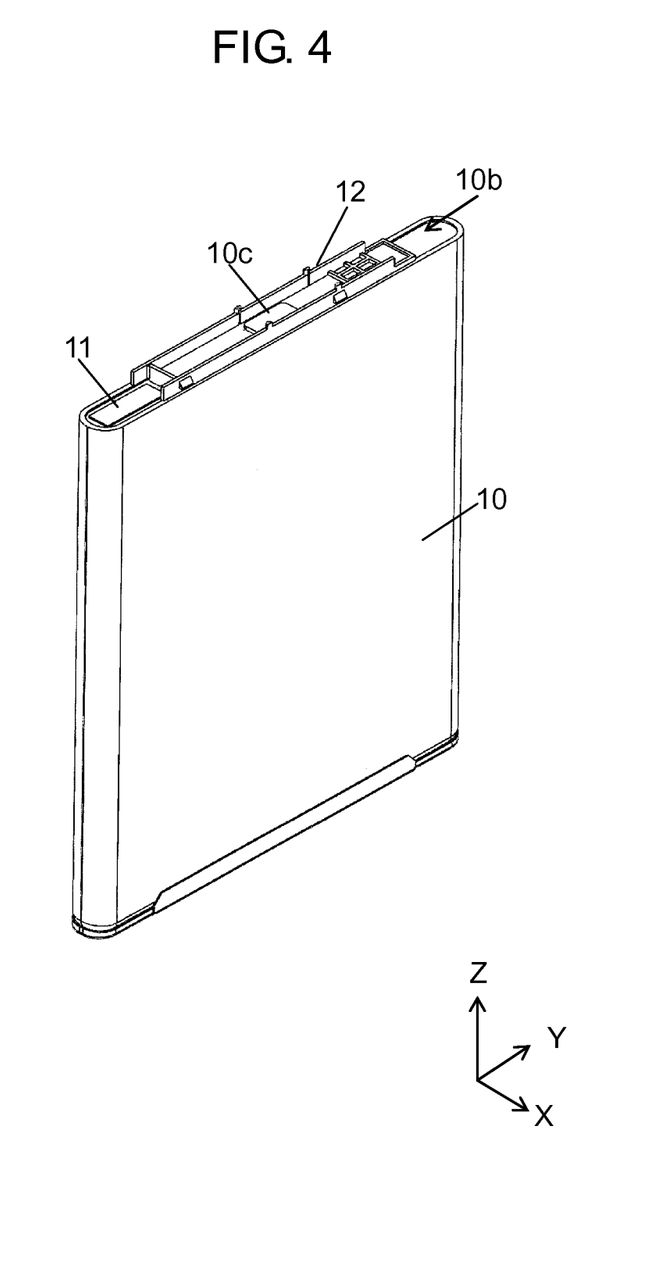
FIG. 4 is a schematic perspective view illustrating a state of setting the board holder 12 to the cell 10.
Figure 5:
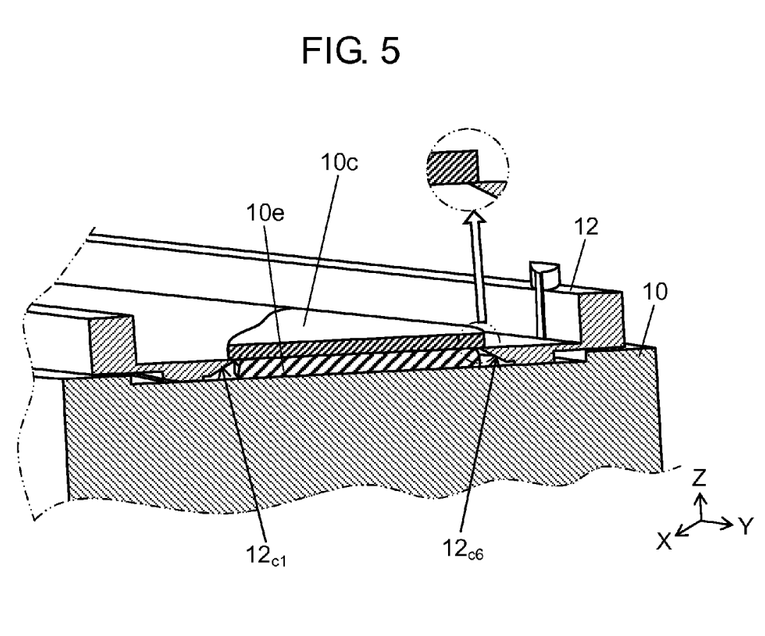
FIG. 5 is a schematic sectional view illustrating a structure of the board holder 12 being engaged to the cell 10.

In the state of setting the board holder 12 to the cell 10, mutual positional relation in parts is explained using FIG. 4 and FIG. 5. As shown in FIG. 4, at the time of setting the board holder 12 to the cell 11, the negative terminal 10c of the cell 10 is inserted into and penetrates the window portion 12a of the board holder 12 (see FIG. 2). And in the opening edge sides of the window portion 12a in the board holder 12, the six projecting portions 12c1, 12c2, 12c3, 12c4, 12c5, 12c6 are inserted into and engaged with portion between the under surface of the negative terminal 10c of the cell 10 and the surface of the sealing plate 10b.

Concretely, as shown in FIG. 5, in the opening edge sides of the window portion 12a in the board holder 12, the six opening edge sides having the six projecting portions 12c1, 12c2, 12c3, 12c4, 12c5, 12c6 (the projecting portion of a wedge shape) densely contact the under surface of the negative terminal 10c of the cell 10. Accordingly, only by the work of pressing and inserting the board holder 12 to the cell 10 in the axis Z minus direction, engaging the board holder 12 with the cell 11 is certainly carried out.

Further, in FIG. 5, in the six projecting portions 12c1, 12c2, 12c3, 12c4, 12c5, 12c6, only the two cross-section views of the projecting portion 12c1, 12c6 are shown. But each tip portion of the other projecting portions 12c2, 12c3, 12c4, 12c5 contacts the under surface of the negative terminal 10c in the same way. Here, as shown in the circle of the two-dot chain line in FIG. 5, the overlapped length between each tip portion of the other projecting portions 12c1, 12c2, 12c3, 12c4, 12c5, 12c6 and the under surface of the negative terminal 10c is not limited in a specific value or ratio. However, if such length is too big, big pressing or pushing strength is necessary at the time of setting the board holder 12. In contrast, if such length is too small, engaging or contacting is not certainly carried out by a necessary strength. Accordingly such overlapped length is, for example, preferably the range of 0.02 [mm] to 0.08 [mm], more preferably 0.05 [mm].

5. Effect

In the battery pack of the embodiment 1 of the present invention, as mentioned above, the tips of the plural projecting portions 12c1, 12c2, 12c3, 12c4, 12c5, 12c6 of the opening edge sides of the window portion 12a in the board holder 12 contacts the negative terminal 10c of the cell 10. Accordingly the board holder 12 is engaged with or contact the cell in the positioned state. Therefore, in the configuration of conventional art, the board holder is sandwiched between the cell and the circuit board. Compared with this, in the embodiment 1 of the present invention, in a manufacturing step after setting the board holder 12 to the cell 10, positioning of the board holder 12 need not be carried out every time of manufacturing steps, then works in manufacturing steps are not complicated.

Further, in the battery pack of the embodiment 1 of the present invention, as mentioned above, the tips of the plural projecting portions 12c1, 12c2, 12c3, 12c4, 12c5, 12c6 of the opening edge sides of the window portion 12a in the board holder 12 are engaged with or contact the negative terminal 10c of the cell 10. By this, the board holder 12 is set to the cell 10. In the above mentioned conventional art, the projection of the board holder is inserted into the recess of the cell, and the tip of the projection is crushed. Compared with this conventional art, in the embodiment 1, big pressing power or the like is not necessary at the time of assembling the board holder 12. In addition, after this assembling, the board holder 12 does not easily come off from the cell 10.

Therefore, in the battery pack 1, a board holder 12 is certainly fixed to the cell 10 without complicated works at the time of manufacturing.

In addition, in the above configuration of the battery pack 1, the negative terminal 10c has the T shape in cross-section view, and externally projects from the surface of the sealing plate 10b. In each of the projecting portions 12c1, 12c2, 12c3, 12c4, 12c5, 12c6 in the board holder 12, it has the wedge shape in cross section view, the upper surface thereof is in a horizontal plane surface, the under surface thereof is in the inclined plane. And the above horizontal plane surfaces of all projecting portions 12c1, 12c2, 12c3, 12c4, 12c5, 12c6 contact the under surface of the overhanging portion of the eaves shape in the negative terminal 10c of the cell 10. By using such configuration, at the time of setting the board holder 12 to the cell 10, the window portion 12a of the board holder 12 is pressed and inserted to the negative terminal 10c of the cell 10, till each of the tips of the projecting portions 12c1, 12c2, 12c3, 12c4, 12c5, 12c6 of the wedge shape contacts the under surface of the negative terminal 10c. By this work, setting the board holder 12 to the cell 10 is completed. Therefore, a board holder 12 is certainly fixed to the cell 10 without complicated works.

Further, the plural projecting portions 12c1, 12c2, 12c3, 12c4, 12c5, 12c6 each having the wedge shape are pushed into the under surface of the negative terminal 10c of the cell 10. Therefore, after that, the engagement therebetween does not easily come off. In addition, in the battery pack 1, the negative terminal 10c has the plane of the rectangular shape with the rounded corners (see FIG. 3 or the like), and the window portion 12a of the board holder 12 has the plane of the octagonal opening shape (see FIG. 2 and the like). And the plural projecting portions 12c1, 12c2, 12c3, 12c4, 12c5, 12c6 are each engaged with, and each contact the rounded corner of the negative terminal 10c of the cell 10, and the short side portion of the negative terminal 10c. Therefore, it is possible to set the board holder 12 to the cell 10 by small pressing or pushing strength, and as mentioned above, once it is set, it is hard to come off.

Embodiment 2

1. An Outline of a Configuration

Figure 6:
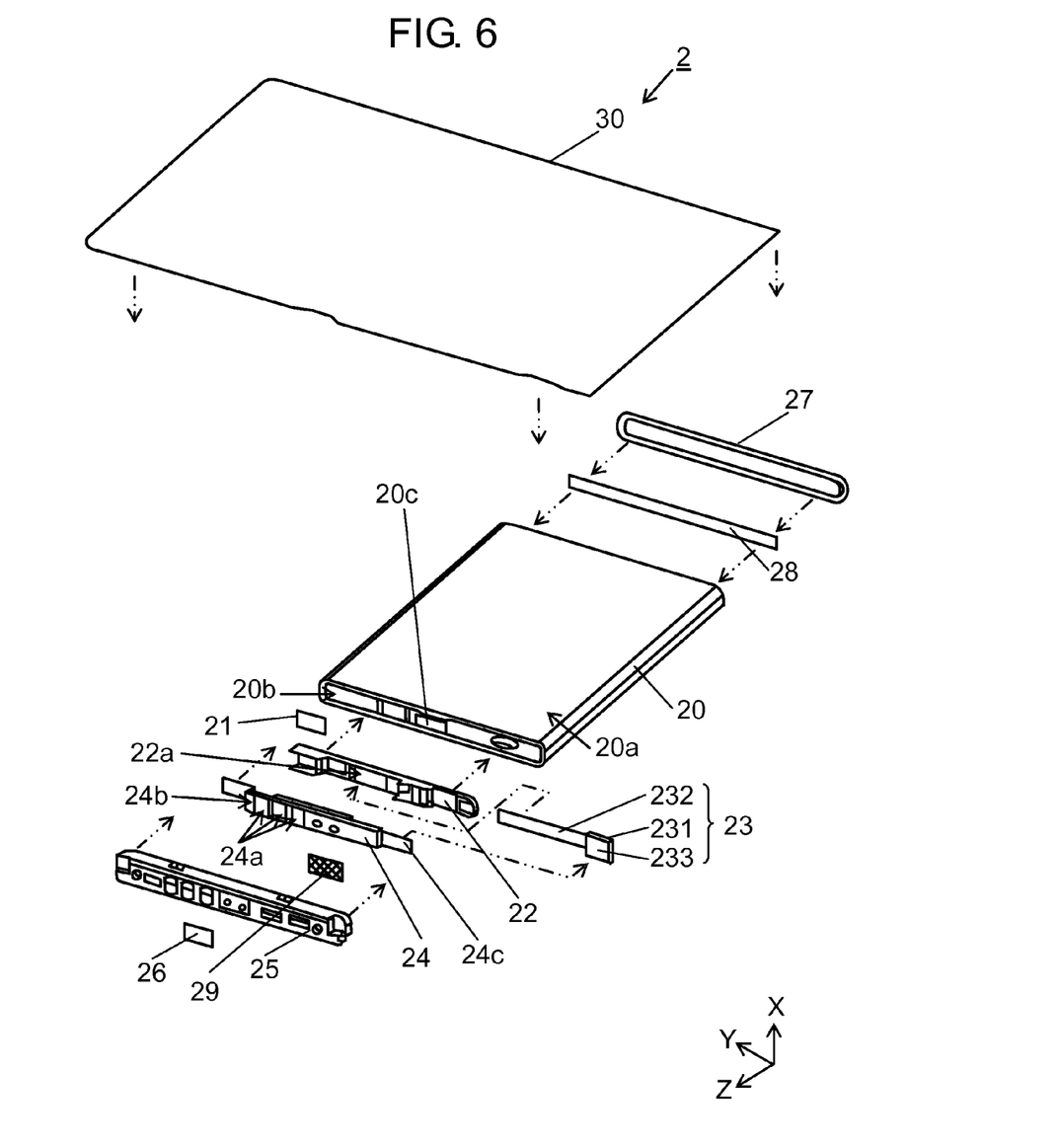
FIG. 6 is an exploded schematic perspective view illustrating a structure of a battery pack 2 related to an embodiment 2 of the present invention.

The outline of the configuration of a battery back related to the embodiment 2 of this invention is explained using FIG. 6. As shown in FIG. 6, the battery back 2 related to the embodiment 2 includes a flat prismatic shaped cell 10. A negative terminal 20c externally projects from a surface of a sealing plate 20b closing a top opening of a cell case 20a toward the left front side in the axis Y direction. Further, a clad plate 21 is connected to the sealing plate 20b in the left back side in the axis Y direction.

An electric circuit board 24 disposed facing the sealing plate 20b of the cell 20, and a board holder 22 made of resin is disposed between the circuit board 24 and the sealing plate 20b. The board holder 22 has a window portion 22a in the middle of in the axis Y direction, and the window portion 22a allows a negative terminal 20c to be inserted through. A PTC element 23 is sandwiched between the board holder 22 and the circuit board 24. The PTC element 23 in the same as the PTC element 13 of the battery pack 1 in the above embodiment 1, an element body 231 is sandwiched between two of the element leads 232, 233. One element lead 232 of the PTC element 23 is connected to the upper surface of the negative terminal 20c exposed through the window portion 22a of the board holder 22. And the other element lead 233 is connected to a board lead 24c extended in the right front side of in the axis Y direction.

A board lead 24b in the right back side of in the axis Y direction is connected to the sealing plate 20b of the cell 20 through the clad plate 21. A cap 25 has window portions opened, and External terminals 24a of the circuit board 24 are exposed from each of the window portions. a submersion confirmation seal 29 and a label 26 is stuck on the upper surface of the cap 25.

A bottom cover 27 is fixed to the bottom surface of the cell case 20 by a two-faced adhesive tape 28. In addition, an outer label 30 is stuck mainly to the cell case 20a of the cell 20, exposing partial portions of the cap 25 and the bottom cover 27.

2. A Configuration of a Board Holder 22

Figure 7:
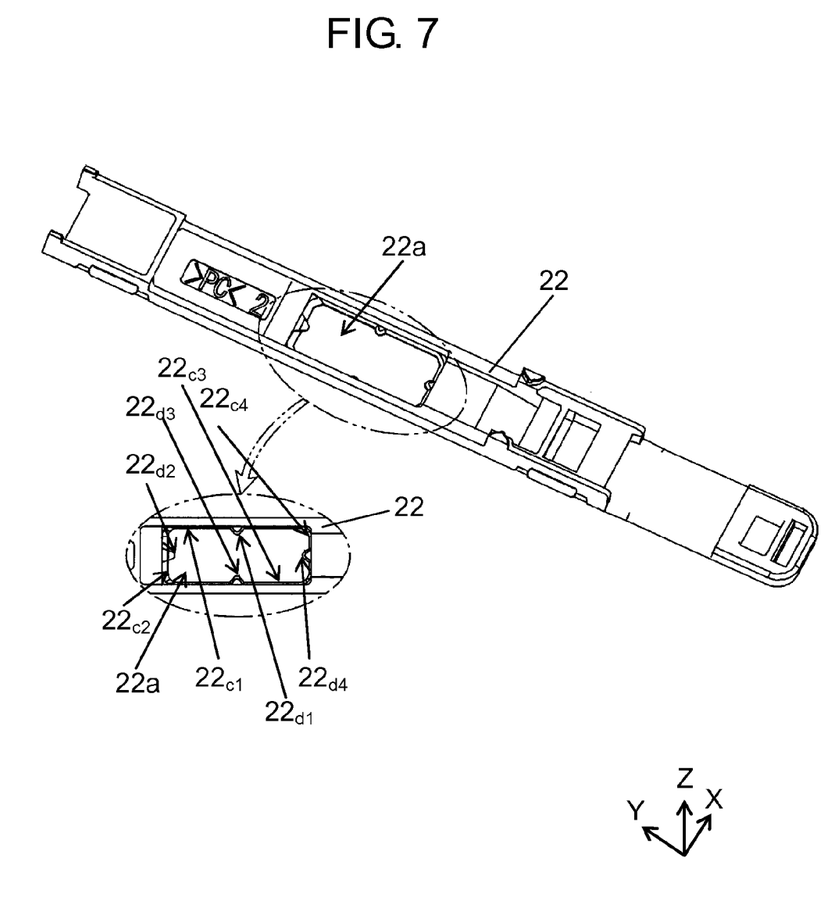
FIG. 7 is a schematic perspective view illustrating a structure a board holder 22 in the battery pack 2.

The configuration of the board holder 22 is explained using FIG. 7.

As shown in FIG. 7, the window portion 22a of an approximately rectangular shape of the board holder 22 is opened in the middle portion of the longitudinal direction (the axis Y direction). And as shown in the circle of the two-dot chain line in FIG. 7, in a partial portion in each of opening edge sides 22c1, 22c2, 22c3, 22c4 of the window portion 22a of the board holder 22, projecting portion 22d1, 22d2, 22d3, 22d4 projecting toward the center of the window portion 22a is provided in the state of being dispersed each other.

Each projecting portion 22d1, 22d2, 22d3, 22d4 has a spindle shape having a rounded tip, and decreases in cross-sectional size toward the tips.

3. A State of Setting the Board Holder 22 to the Cell 20

Figure 8A:
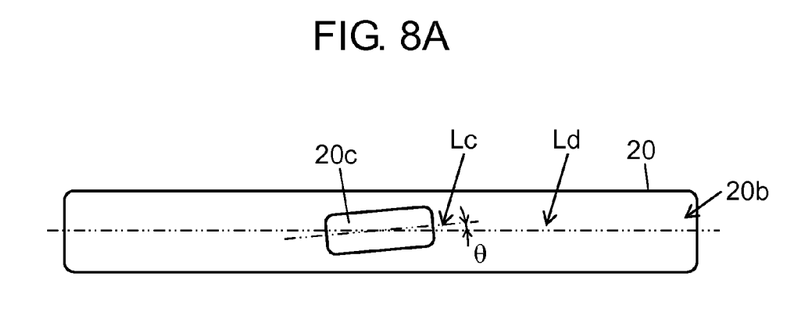
FIG. 8(a) is a schematic plan view from above of a cell 20.
Figure 8B:
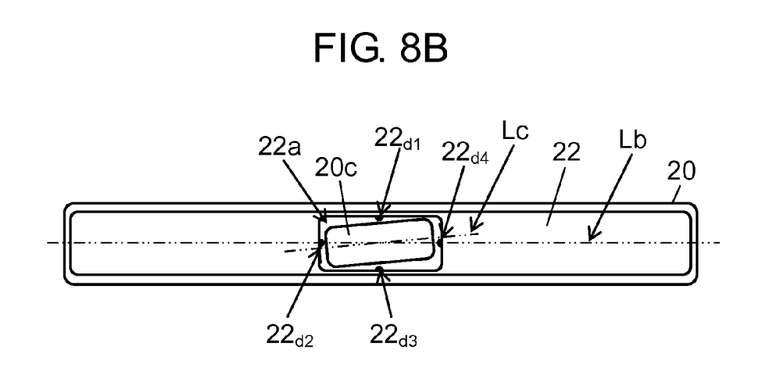
FIG. 8(b) is a schematic plan view illustrating a state of setting a board holder 22 related to an embodiment 2.
Figure 8C:
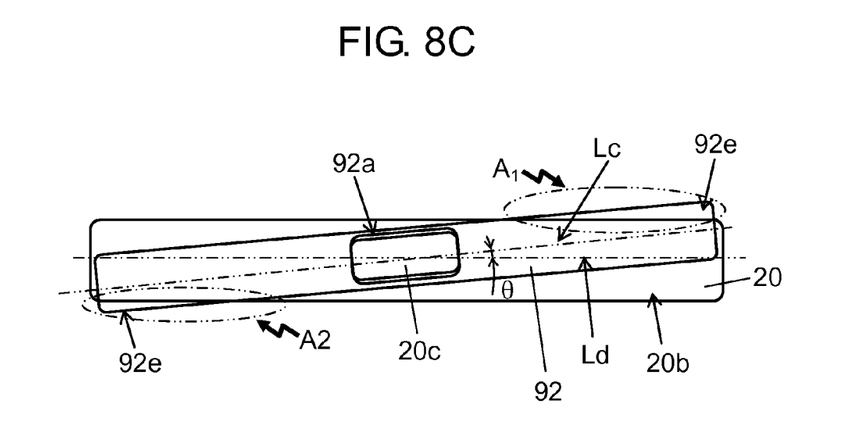
FIG. 8(c) is a schematic plan view illustrating a state of setting a board holder 92 related to a comparative example.
Figure 9A:
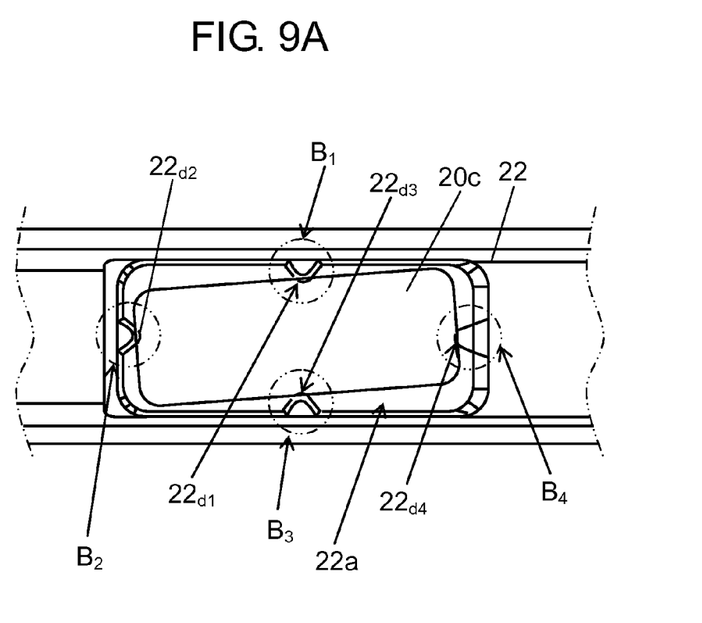
FIG. 9(a) is a schematic plan view in a state of setting the board holder 22 to the cell 20 illustrating a relation of the projecting portions 22d1, 22d2, 22d3, 22d4 of the board holder 22 and the negative terminal 20c of the cell 20.

The state of setting the board holder 22 to the cell 20 is explained using FIG. 8 and FIG. 9. FIG. 8(a) is a schematic plan view from above of the sealing plate 20b and the negative terminal 20c, FIG. 8(b) is a schematic plan view illustrating a state of setting the board holder 22, FIG. 8(c) is a schematic plan view illustrating a state of setting a board holder 92 related to a comparative example.

First of all, as shown in FIG. 8(a), in the cell 20, the center line Lc of the negative terminal 20c is inclined at an angle theta to the center line Lb of the sealing plate 20b. Here, in FIG. 8(a) to FIG. 8(b), the angle theta is exaggerated beyond what occurs in the real cell 20. Next, as shown in FIG. 8(a), when the board holder 22 of this embodiment is set to the cell 20 where the center line Lc of the negative terminal 20c is inclined at an angle theta to the center line Lb of the sealing plate 20b, as the inner size of the window portion 22a except the projecting portions 22d1, 22d2, 22d3, 22d4 is a little bigger than the negative terminal 20c, by rotating the board holder 22, its center line and the center line Lb of the sealing plate can be matched. Further, as shown FIG. 9(a), in its state, the tip portions of the projecting portions 22d1, 22d2, 22d3, 22d4 of the opening edge sides 22c1, 22c2, 22c3, 22c4 of the window portion 22a densely contact the side surfaces of the negative terminal 20c of the cell 20 (circles B1 to B4 in FIG. 9(a)). Accordingly, the board holder 22 set to the cell 20 need not to be of positioning of the board holder 22 every time manufacturing works are carried out after it. Therefore, work efficiency is excellent.

Figure 9B:
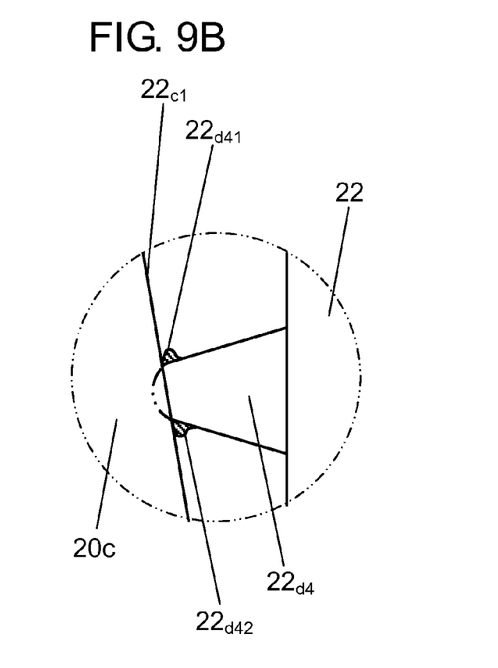
FIG. 9(b) is a schematic plan view of the projecting portion 22d4 in a state of the projecting portion being engaged to the negative terminal 20c.

In addition, as the tip portions of the projecting portions 22d1, 22d2, 22d3, 22d4 contact the side surface of the negative terminal 20c, big pressing or pushing strength is not necessary. And it is hard that the board holder 22 comes off from the cell 20 after assembling. Further, as shown in FIG. 9(b), by rotating against the center line of the sealing plate 20b in the cell 20, at least partial portions of the tips of the projecting portions 22d1, 22d2, 22d3, 22d4 are at least partially crushed (crushed portions 22d41, 22d42). By such crushed portions 22d41, 22d42 being formed, contact resistance at the tip portions of the projecting portions 22d1, 22d2, 22d3, 22d4 against the side surface of the negative terminal 20c is increased. After the board holder 22 is set to the cell 20c, it is prevented that the board holder 22 comes off.

Here, in FIG. 9(b), the tip of the projecting portion 22d4 is crushed. However tips of the projecting portion are crushed depending on rotating direction and rotating angle of the board holder 22 against the negative terminal 20c. Further, in this embodiment, projecting degree of the projecting portions 22d1, 22d2, 22d3, 22d4 is not limited in a specific value or ratio. For example, the range of about 0.1 [mm] to 0.3 [mm], concretely about 0.2 [mm] is preferable.

Here, as shown in FIG. 8(c), when a board holder 92 related to conventional art is set to the cell 20 shown in FIG. 8(a), the center line of the board holder 92 and the center line Lc of the negative terminal 20c are matched, and the center line of the board holder 92 to the center line Lb the sealing plate 20b is set at an angle theta. Then when the angle theta is big, the partial portions 92e of ends of the board holder 92 in the longitudinal direction protrude to the outside of the sealing plate 20b of the cell 20 as shown in the circle A1, A2 of the two-dot chain line in FIG. 8(c). In this case, the outer size of the battery pack becomes bigger, then problem occurs.

Here, in FIG. 8(c), among the four opening edge sides of the window portion 92a of the board holder 92, the facing two short sides contact the side surface of the negative terminal 20c. If there is a structure in which any of the opening edge sides does not contact the side surface of the negative terminal 20c from the view point of considering compensation of an incline or an angle of the board holder 92, it is necessary to carry out positioning of the board holder to the cell 20 every time manufacturing works are carried out after setting the board holder to the cell 20 as mentioned above. Therefore, from the view point of preventing the complicated works, such a structure cannot be used.

4. Effect

In the battery pack 2 of the embodiment 2 of the present invention, the tip portions of the projecting portions 22d1, 22d2, 22d3, 22d4 projecting from the opening edge sides 22c1, 22c2, 22c3, 22c4 of the window portion 22a individually contact the side surfaces of the negative terminal 20c of the cell 20. Accordingly, the board holder 22 is engaged with the cell 20 in the positioned state. Therefore, in the configuration of conventional art, the board holder is sandwiched between the cell and the circuit board. Compared with this, in the battery pack 2, in a manufacturing step after setting the board holder 22 to the cell 20, positioning of the board holder 22 need not be carried out every time of manufacturing steps, then works in manufacturing steps are not complicated.

In the battery pack 2, the tip portions of the projecting portions 22d1, 22d2, 22d3, 22d4 projecting from the opening edge sides 22c1, 22c2, 22c3, 22c4 of the window portion 22a individually contact the side surfaces of the negative terminal 20c of the cell 20. Accordingly, only by the window portion 12a of the board holder 12 being pressed and inserted to the negative terminal 10c of the cell 10, the board holder 22 can be engaged with the cell 20. In the above mentioned conventional art, the projection of the board holder is inserted into the recess of the cell, and the tip of the projection is crushed. Compared with this conventional art, in the embodiment 2, big pressing or pushing power or the like is not necessary at the time of assembling the board holder 22. In addition, after this assembling, the board holder 22 does not easily come off from the cell 20.

Therefore, in the battery pack 2, the board holder 22 is certainly fixed to the cell 20 without complicated works at the time of manufacturing. In addition, when by accumulation of errors or the like at the time of manufacturing the cell 20 the center line Lc of the negative terminal 20c is a little inclined to the center line Lb of the sealing plate 20b (being inclined at an angle theta in FIG. 8(a)) as shown in FIG. 8(a), as shown in FIG. 8(b) by rotating the board holder 22 to the negative terminal 20c of the cell 20, the manufacturing errors can be absorbed. Therefore, the relative position of the board holder 22 to the sealing plate 20b of the cell 20 can be within the appropriate range, and the yield at the time of manufacturing can be improved.

Here, even after carrying out such angle adjustment by rotating the board holder 22, the tips of the projecting portions 22d1, 22d2, 22d3, 22d4 individually contact the side surfaces of the negative terminal 20c, and it is hard that the board holder 22 set to the cell 20 comes off after assembling. Further, as shown in FIG. 9(b), at least partial portions of the projecting portions 22d1, 22d2, 22d3, 22d4 are crushed against the side surfaces of the negative terminal 20c. By such crushed portions, contact resistance at the tip portions of the projecting portions 22d1, 22d2, 22d3, 22d4 against the side surface of the negative terminal 20c is increased. Therefore, it is hard that the board holder 22 comes off after assembling.

Other Considerations

Although the previously described embodiments 1, 2 showed the flat solid rectangular lithium ion cell batteries, as examples of cell 10, 20, the present invention is not limited to this. For example, in a battery cell shape, cells can have a circular cylindrical shape, a gum shape, or a film type cell case using laminate film. Further, in a battery cell type, besides lithium ion, for example, nickel cadmium rechargeable batteries and nickel hydride rechargeable batteries can also be used.

Although the previously described embodiments 1, 2 showed the one cell 10, 20 as examples, the present invention is not limited to this. For example, equal to or more than two cells can be used in the configuration of embodiments, and it has the same effect as above. In addition, in the above embodiment 1, the six projecting portions 12c1, 12c2, 12c3, 12c4, 12c5, 12c6 formed on the board holder 12 is explained as one example, the present invention is not limited to this. For example, the number of the projecting portions can be equal to or less than five, or equal to or more than seven.

In the same way, in the above embodiment 2, the four projecting portions 22d1, 22d2, 22d3, 22d4 formed on the board holder 22 are explained as one example. For example, the number of the projecting portions can be equal to or less than three, or equal to or more than five.

INDUSTRIAL APPLICABILITY

In the present invention, a battery pack can be manufactured without complicated works, a low cost, and suitable for an electric power source of a mobile electric equipment.

The invention claimed is:

1. A battery pack comprising:
a cell including a cell case having a flat prismatic shape and a bottom portion and a top opening, a sealing plate closing the top opening, and a terminal externally projecting from a surface of the sealing plate;
an electric circuit board disposed facing the sealing plate; and
a board holder made of resin, and being disposed between the sealing plate of the cell and the circuit board,
wherein a window portion allowing the terminal of the cell to be inserted through is opened in the board holder,
wherein projecting portions are provided projecting inward in the window portion in plural locations of the edge sides facing the window portion in the board holder, and the plural projecting portions in the board holder each decrease in cross-sectional size toward the tips of the plural projecting portions,
wherein the board holder is engaged in position by the tips of the plural projecting portions at least partially contacting the outer surface of the terminal of the cell.

2. The battery pack according to claim 1, wherein the terminal of the cell has a T shaped cross section of which the base is narrower than the tip thereof, and externally projects from the surface of the sealing plate,
wherein the projecting portions in the board holder have wedge-shaped cross sections which each decrease in cross-sectional size toward the tips of the plural projecting portions,
wherein the tips of the projecting portions at least partially contact the under surface of the projection of an eaves shape in the terminal.

3. The battery pack according to claim 2, wherein the terminal of the cell has a plane of a rectangular shape with rounded corners, and the window portion of the board holder has a plane of an octagonal opening shape, and the plural projecting portions at least partially contact the rounded corners of the terminal of the cell.

4. The battery pack according to claim 3, wherein the terminal of the cell has the plane of the rectangular shape with the rounded corners, the plural projecting portions partially contact short side portions of the terminal of the cell.

5. The battery pack according to claim 4, wherein a gasket is sandwiched between the sealing plate and a part of the under surface of an overhanging portion of an eaves shape of the terminal, and is made of lower elastic modulus of material than the terminal.

6. The battery pack according to claim 3, wherein a gasket is sandwiched between the sealing plate and a part of the under surface of an overhanging portion of an eaves shape of the terminal, and is made of lower elastic modulus of material than the terminal.

7. The battery pack according to claim 2, wherein a gasket is sandwiched between the sealing plate and a part of the under surface of an overhanging portion of an eaves shape of the terminal, and is made of lower elastic modulus of material than the terminal.

8. The battery pack according to claim 1, wherein each tip of the plural projecting portions has a spindle or frustum shape, and is dispersed each other, and the tips of the plural projecting portions at least partially contact the side surface of the terminal of the cell.

9. The battery pack according to claim 8, wherein the plural projecting portions of the board holder at least partially contact the side surface of the terminal in a crushed state of the tips thereof.

* * * * *